FREQUENCY GENERATING SYSTEM

Filed Nov. 23, 1956 4 Sheets-Sheet 1

INVENTORS
HERBERT P. JACOBSON
WILLIAM C. PERKINS
JOHN R. SHERWOOD
BY Moody and Goldman
ATTORNEYS May 12, 1959 W. C. PERKINS ET AL 2,886,708

FREQUENCY GENERATING SYSTEM

Filed Nov. 23, 1956 4 Sheets-Sheet 2

INVENTORS

HERBERT P. JACOBSON

WILLIAM C. PERKINS

JOHN R. SHERWOOD

BY Moody and Goldman

ATTORNEYS

INVENTORS
HERBERT P. JACOBSON
WILLIAM C. PERKINS
JOHN R. SHERWOOD
BY Moody and Goldman
ATTORNEYS INVENTORS
HERBERT P. JACOBSON
WILLIAM C. PERKINS
JOHN R. SHERWOOD
BY Moody and Goldman
ATTORNEYS United States Patent Office 2,886,708

Patented May 12, 1959

2,886,708

FREQUENCY GENERATING SYSTEM

William C. Perkins and John R. Sherwood, Cedar Rapids, Iowa, and Herbert P. Jacobson, Quito, Ecuador, assignors to Collins Radio Company, Cedar Rapids, Iowa, a corporation of Iowa Application November 23, 1956, Serial No. 624,044

20 Claims. (Cl. 250—36)

This invention relates generally to a frequency generating system utilizing oscillator means, wherein a continuously variable oscillator has either its direct or multiplied output frequency compared to and stabilized by the output of a fixed-frequency source having high-order stability, such as a temperature-controlled crystal oscillator.

The invention is capable of providing either of two types of frequency outputs over a large frequency range. One type of frequency output is a continuously variable one. The other type varies in predetermined increments that are related decade-wise, and for example may vary in frequency steps of a fraction of a kilocycle over a 2 to 32 megacycle-per-second range. The invention is also capable of providing virtually any kind of modulation on any of its output frequencies.

The invention can obtain a stability for any frequency in its incremental frequency output that is substantially equal to the stability of its reference-frequency source, which may be one part in $10^8$ per day.

The system of the invention includes an interpolation oscillator which is used during both the "incremental" and "continuous" types of frequency outputs. The "continuous" output of the system only has the frequency error of the interpolation oscillator without any error contribution by the variable-master oscillator.

However, during incremental operation, the output signal of the system does not contain the error or instability of either the master oscillator or interpolation oscillator.

It is an object of this invention to provide means for multiplying the number of output frequencies of the system without undue addition of components to the system.

It is another object of this invention to maintain the same order of absolute-frequency error over its entire range, which may be 2 to 32 megacycles-per-second. It is still another object to provide an optimum signal-to-noise ratio over the entire output range.

It is a further object of this invention to provide means for generating any of its output frequencies with any type of modulation imposed on it, such as single sideband, twin sideband, amplitude, multiplex, angular, predicted wave, baud synchronous, etc. modulation.

The invention uses a frequency-standard source which provides a plurality of frequencies that are all derived from a single highly-stable crystal oscillator. Regenerative frequency dividers and frequency multipliers are the preferable means for deriving the required frequencies.

During incremental operation, the system utilizes two channels which receive input frequencies from the fixed source having different orders of magnitude. The first channel receives the higher-order frequency, derives from it a particular harmonic within or near the output-frequency range of the system, heterodynes the particular harmonic with an output (or outputs) derived directly from a variable-master oscillator, and again heterodynes the signal with the output of an interpolation oscillator to provide the output of the first channel.

Furthermore, the second channel receives the lower-order frequency from the source, derives from it a particular harmonic within a range equal to the spacing between two adjacent harmonics provided in the first channel. Then the second channel heterodynes the particular harmonic with the output of the interpolation oscillator and passes the signal through a particular narrow band-pass filter which passes the required heterodyned harmonic. One of a plurality of sidestep frequencies is also selected from the frequency-standard source, and is heterodyned with the signal to provide the output frequency from the second channel.

Still further, the output frequency of the first and second channels are compared frequency and phase-wise, wherein a voltage proportional to their frequency and phase difference is derived and used to operate regulator means that adjusts the output frequency of the variable-master oscillator to maintain a phase-locked condition between the outputs of both channels.

The system includes at least coarse and fine frequency control means, which have their settings added by a differential transmission to tune the variable-master oscillator and select the reference harmonic in the first channel. The fine control directly tunes the interpolation oscillator and selects the reference frequency in the second channel.

The fine control also cooperates with the sidestep frequency selection in the second channel, wherein the difference between the sidestep frequencies is equal to the increment between adjacent output frequencies of the system. Thus, as the output frequency of the system moves through such increments, the sidestep frequencies are switched synchronously by the fine control.

A frequency mixing system is further provided by the invention that heterodynes intelligence onto component frequencies, generated in the stabilization system without requiring additional frequencies, except for an intelligence I.F., in a manner that provides continuous band coverage over the entire frequency range of the system and without causing spurious frequencies in the modulated output.

It is a still further object of this invention to provide a stabilized-frequency system that can have a range from 1.7 through 32.3 megacycles-per-second, wherein not more than two heterodyning stages are required to synthesize any modulated frequency within the range. Distortion generally occurs in the heterodyning process, and it is essential to minimize the number of heterodyning steps to obtain maximum fidelity for a system.

Further objects, features and advantages of this invention will be apparent to a person skilled in the art upon further study of the specification and drawings, in which.

Figure 1:
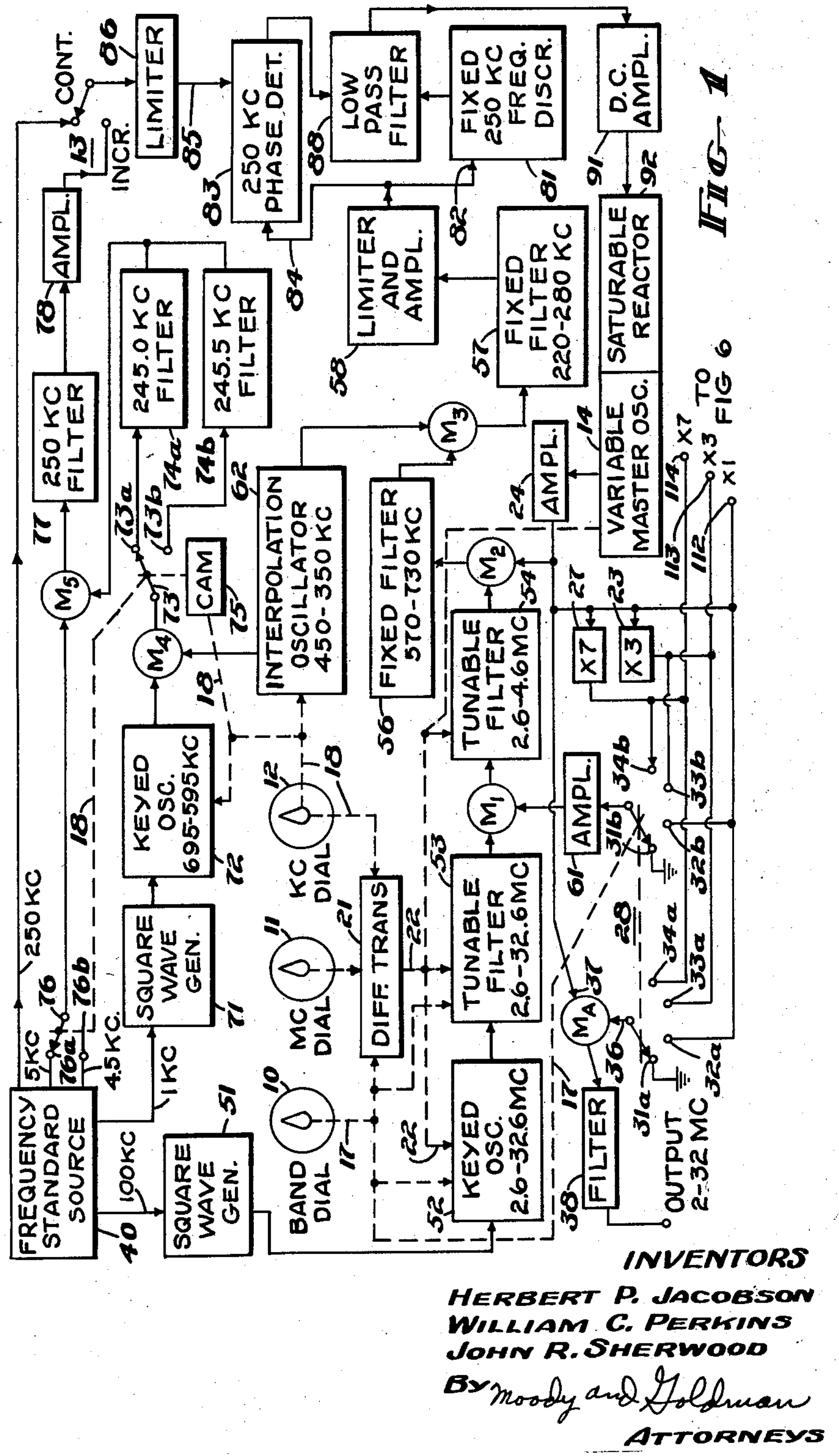
Figure 1 is an illustrative block diagram of the invention.

Figure 1 will now be considered in order to obtain a more detailed understanding of the invention. The system is controlled in a decade manner by three knobs 10, 11 and 12. A selector switch 13 determines whether the system will provide a "continuous" or "incremental" type of output. With its "continuous" output, the system can provide continuous frequency variation over the 2 to 32 megacycle range using knobs 10, 11 and 12, with an absolute-frequency stability determined only by the stability of an interpolation oscillator 62 which for example may tune from 450 to 350 kilocycles with an absolute error of less than plus-or-minus 100 cycles-per-second.

The other position of selector switch 13 is designated as "incremental." In this position knobs 10, 11 and 12 can select any of 60,000 different frequencies in the 2 to 32 megacycle range which vary in one-half kilocycle steps.

Band switch 10 determines the degrees of multiplication required for the output of a variable-master oscillator 14 to obtain the output-frequency range required by the system.

A megacycle dial cooperates with knob 11 to indicate the output frequency of the system to one-tenth of a megacycle. That is, it is graduated in 100-kilocycle steps.

A kilocycle dial cooperates with knob 12 and is graduated in at least one-half kilocycle steps from zero to 100-kilocycles to indicate such variation in the output frequency of the system.

Thus, a decade reading of the system's output frequency can be directly obtained from dials 11 and 12 with dial 11 providing the megacycle and 100-kilocycle digits, and dial 12 providing the ten-kilocycle, one-kilocycle digits, and one-tenth-kilocycle digits.

Variable-master oscillator 14 tunes from two to four megacycles-per-second in the illustrated system, and different multiples of the variable-master oscillator frequency obtain frequencies over the 2 to 32 megacycle range, wherein each multiple provides a different band.

It is possible to eliminate band knob 10 by providing mechanical means (not shown) connected between its shaft 17 and megacycle knob 11, since the position of the megacycle knob can be related to the desired band.

The mechanical information provided by the knobs to the electrical system is in three forms. The first form is obtained directly from band knob 10 and is provided by shaft 17.

The second form of mechanical information is obtained directly from the setting of kilocycle knob 12 and its connecting shafts 18, which are capable of defining frequency variations in at least one-half kilocycle amounts. It is preferable that smaller graduations be provided because the output of the system, when continuous, is capable of providing greater absolute-frequency stability than one-half kilocycle.

The third form of mechanical information is a combined form that uses a differential-transmission device 21 to combine the settings of megacycle knob 11 and kilocycle knob 12. Its output shaft 22 provides the combined information with a rotational position that represents the addition of the frequency settings of knobs 11 and 12. Due to the fact that plural bands are used in the system, a different transmission ratio is used for each band between the two knob inputs to differential-transmission device 21. This is because one revolution of kilocycle knob 12 provides a 100-kilocycle variation in any band, while one revolution of knob 11 provides a frequency variation over one band, which is 2 to 4 megacycles in band one and 16 to 32 megacycles in band four, for example. The different transmission ratios may be obtained by having plural differential transmissions in device 21 and by shifting among them with the setting of band knob 10.

The unstabilized generation of the frequency output of the system is first considered. Variable-master oscillator 14 is capable of continuously tuning from 2 to 4 megacycles and is assumed to have a stability of better than 1,000 parts per million. It is tuned by output shaft 22 of differential-transmission device 21.

An amplifier 24 is connected to the output of master oscillator 14. The inputs of a pair of frequency multipliers 23 and 27 are connected to the output of amplifier 24. Multiplier 23 multiplies the master-oscillator frequency by three; and multiplier 27 multiplies the master-oscillator frequency by seven.

A band switch 28 has four terminals 31, 32, 33 and 34 with a terminal 31 connected to ground, terminal 32 connected to the output of amplifier 24, terminal 33 connected to the output of the multiplier 23, and terminal 34 connected to the output of multiplier 27.

A mixer $M_A$ has one input 36 connected to the pole of band switch 28; and a second input 37 is connected to the output of amplifier 24 to receive the unmultiplied master-oscillator output frequency. The first-order summed output from mixer $M_A$ is selected by a tunable filter 38 to provide the 2 to 32 megacycle output frequency of the system over the four-band positions of switch 28.

The first band is obtained with the illustrated position of band switch 28 with terminals **31*a* and 31*b* connected to ground. Here, a direct-single connection is provided from the output of amplifier 24 to mixer $M_A$, and no heterodyning occurs and a direct 2 to 4 megacycle output is obtained from filter 38. When band switch 28 is in its second-band position, it engages contact 32*a* to provide a direct connection from master-oscillator amplifier 24 to input 36 of mixer $M_A$ and to provide a connection from amplifier 24 through ×3 multiplier 23 to input 37 of mixer $M_A$. Thus, filter 38** provides the first-order difference output frequency between 4 and 8 megacycles.

Similarly, in band three, the poles of switch 28 engage third contacts **33*a* and 33*b* to connect the output of multiplier 23 to mixer input 37 with the direct connection being maintained to mixer input 36. Hence, in band three a frequency between 8 and 16 megacycles is provided by the first-order sum frequency selected by filter 38**.

In a like manner, in band-switch position four, contacts **34*a* and 34*b* are engaged to connect the output of multiplier 27 to input 37 of mixer $M_A$, which similarly has its other input 36 directly connected to amplifier 24. Therefore, in band four, filter 38** provides the first-order sum frequency output from 16 to 32 megacycles.

There will be no crossover type of spurious frequencies generated by mixer $M_A$ because of the exact fractional ratios between its input frequencies, since the input frequencies are derived from the same source which is the output of variable-master oscillator 14. Consequently, when the system is unstabilized, it will provide an output frequency that is indicated in a decade manner by the settings of knobs 10, 11 and 12 with the output frequency differing from the indicated frequency by the frequency error and instability of master oscillator 14, which will generally be less than one-tenth of one percent of the indicated setting.

The frequency-correcting-and-stabilizing part of the system will now be described. The stabilization system uses a frequency-standard source 40, which can easily have a frequency stability of less than one part in $10^8$ per day. Source 40 derives five outputs from its single accurate frequency, that may be a crystal oscillator having a specially cut, temperature-controlled crystal.

Figure 2:
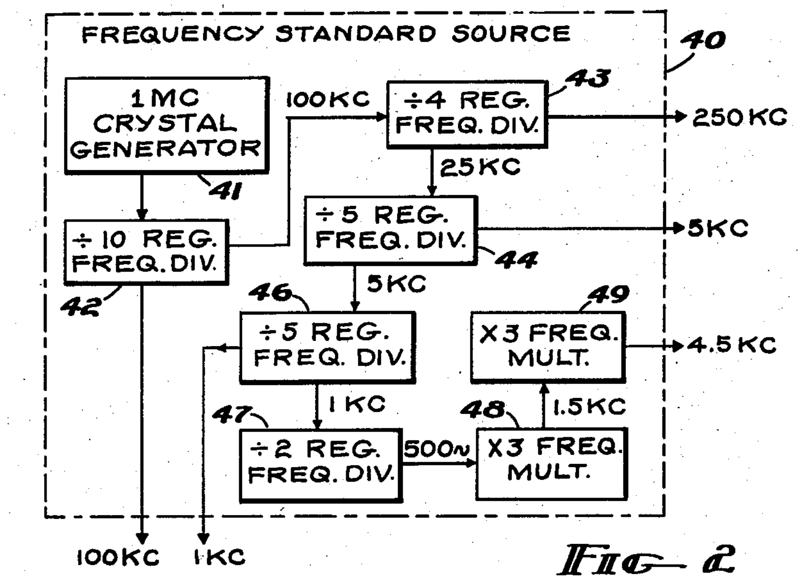
Figure 2 is an illustrative block diagram of a frequency-standard source which may be used with the system shown in Figure 1.

One means for providing frequency-standard source 40 is shown in Figure 2. It uses regenerative-frequency dividers because of their stability, when compared to other types of frequency dividers. Also, the heterodyning action within a regenerative divider can be used to obtain plural-output frequencies when required.

Thus, a frequency divider 42 receives the output from a one megacycle temperature-stabilized crystal oscillator 41 and divides its frequency by ten to provide a 100-kilocycle output for frequency-standard source 40. A second regenerative divider 43 also receives the 100-kilocycle output and divides it by four to provide a 25-kilocycle output. Furthermore, a regenerative divider that divides a 100-kilocycle input frequency by four can be made to provide a low-order mixer component of 250 kilocycles which can be selected by an additional resonant circuit tuned to this frequency and connected to the output of the divider. This provides the 250-kilocycle output from the frequency-standard source. A third regenerative-frequency divider 44 receives the 25-kilocycle frequency and divides it by five to provide the five-kilocycle output of the frequency-standard source. Another frequency divider 46, which divides by five, is connected to the output of divider 44 to provide a one-kilocycle output for frequency-standard source. Still another regenerative frequency divider 47, which divides by two, is connected to the output of divider 46 and provides a one-half kilocycle output. A pair of frequency multipliers 48 and 49 are connected in tandem with the output of divider 47 and together multiply the one-half kilocycle frequency by nine to provide the 4.5-kilocycle output from the frequency-standard source.

Returning to Figure 1, a first-reference channel is provided by the following tandem-connected components: a square-wave generator 51, a keyed oscillator 52, a first-tunable filter 53, a mixer $M_1$, a second-tunable filter 54, a mixer $M_2$, a first-fixed filter 56, a mixer $M_3$, a second fixed filter 57, and limiter-and-amplifier means 58.

Square-wave generator 51 has its input connected to the 100-kilocycle output from frequency-standard source 40 to provide a pulsed output with a 100,000 pulse-per-second repetition rate.

Keyed oscillator 52 is a continuously-variable oscillator which is normally biased below cutoff and is driven above cutoff by pulses received from square-wave generator 51. Keyed oscillator 52 has a continuously tunable frequency from 2.6 to 32.6 megacycles, if it were permitted to be in a free-running state, which however is not permitted in the operation of the invention. Its large frequency range is obtained in practice by plural bands within the oscillator, controlled by knobs 10, 11 and 12.

Figures 3, 4:
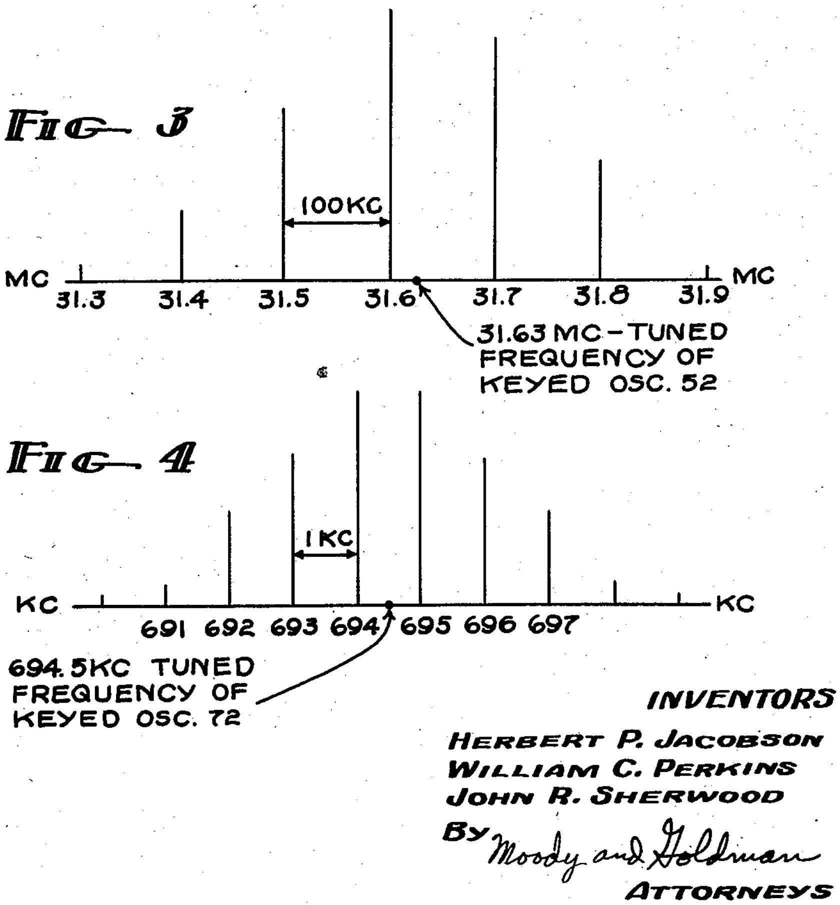
Figures 3 and 4 illustrate keyed spectrums used in the invention.

The output of keyed oscillator 52 concentrates harmonics of the 100-kilocycle source frequency in a small frequency region. That is, the output of keyed oscillator 52 provides a few frequencies which are exact multiples of the 100-kilocycle reference frequency and are closest to the effective tuned frequency of the oscillator. Thus, if keyed oscillator 52 is tuned to a given frequency, it will provide as its output a concentration of the harmonics of the 100-kilocycle reference frequency about the tuned frequency of the keyed oscillator. Figure 3 illustrates the relative amplitudes of a harmonic frequency concentration where the 31.6 megacycle harmonic is closest to the tuned frequency of the keyed oscillator, which is here 31.63 megacycles. Note the amplitude distribution of harmonics in Figure 3, wherein they sharply decrease in amplitude as they become further removed frequency-wise from the tuned frequency of the keyed oscillator. If the keyed oscillator were tuned half-way between two harmonics, then both adjacent harmonics would have approximately equal amplitudes, and the harmonics on either side would rapidly fall off in amplitude. A selected small group includes the required harmonic.

Tunable filter 53 is connected to the output of keyed oscillator 52 and is tuned in the same manner, by the output shaft of differential transmission 21, and by a band arrangement connected to band knob 10 in order to permit its large frequency range which is the same as the range of keyed oscillator 52.

Mixer $M_1$ has one input connected to the output of tunable filter 53. Its second input is connected to the output of an amplifier 61 which provides the frequency selected by the setting of band switch 28. However, in the lowest frequency band (2–4 megacycles), where band switch 28 is grounded, mixer $M_1$ acts only as an amplifier since it only receives a single input. In band two, the second input to mixer $M_1$ is the frequency output of variable-master oscillator 14, obtained with the pole of band switch 28 engaging contact 32*b*. In bands three and four, the second input to mixer $M_1$ is the multiplied output from variable-master oscillator 14 from multipliers 23 and 27, respectively.

Tunable band-pass filter 54 is connected to the output of mixer $M_1$, and it is tuned by differential-output shaft 22 over a range equal to the range of master oscillator 14. In this case, filter 54 is tunable from 2.6 to 4.6 megacycles to select the first-order difference output frequency from mixer $M_1$.

Mixer $M_2$ has one input connected to the output of tunable band-pass filter 54; and another input is connected to amplifier 24 to receive in each band the unmultiplied output frequency of master oscillator 14.

Fixed band-pass filter 56 receives the first-order difference frequency output from mixer $M_2$ and has a band-pass equal to the 100-kilocycle spectrum reference frequency received by its channel (which determines the 100-kilocycle interpolation oscillator range) plus the maximum allowable multiplied error of master oscillator 14 (here it is a maximum of 30 kilocycles) added to each end of its band. In this case, band-pass filter 56 has a band pass from 570 kilocycles to 730 kilocycles.

The dual conversion of the selected harmonic by mixers $M_1$ and $M_2$ presents a very high rejection of an image harmonic which would interfere with the stabilization process if only a single conversion were provided up to fixed filter 56 with master-oscillator frequency multiplications of $\times 1$, $\times 2$, $\times 4$ and $\times 8$ in the respective bands.

Mixer $M_3$ receives as one input the output of fixed band-pass filter 56. Interpolation oscillator 62 provides the other input to mixer $M_3$. Interpolation oscillator 62 is variable over a range equal to the reference frequency received by the first channel, which here is 100 kilocycles. Thus, interpolation is provided between 100-kilocycle spaced frequencies. In this case, interpolation oscillator 62 has a range from 450 to 350 kilocycles. It is tuned directly by kilocycle knob 12; and as the kilocycle dial reading varies from zero to 100 kilocycles, its output frequency varies from 450 to 350 kilocycles. The inverse variation of interpolation oscillator 62 is required in order to provide a fixed output frequency of 250 kilocycles, plus or minus the frequency error of oscillators 14 and 62, at the output of mixer $M_3$. Accordingly, filter 57 has a band pass of 220 to 280 kilocycles.

Amplifier and limiter 58 is connected to the output of band-pass filter 57 to provide a substantially constant-amplitude output from the first channel. The constant-amplitude output is desirable because the signal will thereafter be received by angular-detection means.

A second-reference channel includes: a square-wave generator 71, a keyed oscillator 72, a mixer $M_4$, a filter switch 73, alternate fixed filters 74*a* and 74*b*, a sidestep switch 76, a mixer $M_5$, a fixed filter 77, and an amplifier 78.

Square-wave generator 71 receives the one-kilocycle reference frequency from source 40 and provides a square-wave output with a repetition rate of 1,000 pulses-per-second.

Keyed oscillator 72 is connected to the output of square-wave generator 71; and it is tunable over a range equal to the reference frequency of channel one, which is 100 kilocycles. In this case, keyed oscillator 72 has a range of 695 to 595 kilocycles-per-second. Its purpose is similar to keyed oscillator 52 in channel one. Thus, keyed oscillator 72 obtains a desired harmonic of the one-kilocycle reference frequency with only a few additional harmonics on either side. Figure 4 illustrates a situation where the tuned frequency of keyed oscillator 72 is 694.5 kilocycles. Here, it is midway between the harmonics of the one-kilocycle reference frequency; and the adjacent harmonics, which are 694 and 695 kilocycles, have substantially equal amplitudes. The grouping includes a few other harmonics spaced by one-kilocycle steps, which drop off rapidly in amplitude as the frequency distance increases from the effective tuned frequency of the keyed oscillator.

Keyed oscillator 72 is coupled to kilocycle knob 12 and its output frequency decreases as the indication by the kilocycle dial increases from zero to 100 kilocycles.

Mixer $M_4$ has one input connected to the output of keyed oscillator 72 to receive the selected small group of harmonics, which includes the desired harmonic. Interpolation oscillator 62 provides the other input to mixer $M_4$.

Interpolation oscillator 62 and keyed oscillator 72 are each varied over 100-kilocycle ranges in the same direction by kilocycle knob 12 to maintain a fixed frequency difference of about 245 kilocycles, when knob 12 is set to an integral number of kilocycles.

However, when knob 12 is moved one-half way between integral-kilocycle settings, the frequency difference between interpolation oscillator 62 and keyed oscillator 71 will be about 245.5 kilocycles. This is because the plural output frequencies from keyed oscillator 72 are locked harmonically to the one-kilocycle reference frequency. Consequently, when kilocycle knob 12 is moved one-half way between integral settings, there will not be any frequency change at the output of keyed oscillator 72; although there will be a change in the amplitudes of the harmonics, with two equal amplitude harmonics being provided, as illustrated in Figure 4. One such harmonic will heterodyne to 245.5 kilocycles and the other will heterodyne to 244.5 kilocycles.

Fixed filters 74*a* and 74*b* are provided to respectively receive the mixer outputs. They have very narrow bandpasses so that they can select a desired mixer product and reject undesired mixer products which are only one-kilocycle away. Accordingly, filters 74*a* and 74*b* have as narrow a bandpass as is practical. This is preferably a bandpass of plus-or-minus 250 cycles-per-second which may be obtained with mechanical filters such as Collins type Nos. F245–05 and F245.5–05 that have center frequencies of 245.0 and 245.5 kilocycles, with 50-decibel rejection at 750 cycles away.

Theoretically, a single filter can be used in place of filters 74*a* and 74*b*. It would have a bandpass which would include the frequencies 245.0 and 245.5 kilocycles and should provide about 80 decibels rejection of the frequencies 244.5 and 246.0 kilocycles. At present, such a filter is difficult to build and expensive compared to the system shown in Figure 1, where the filters are commonly available. The smaller bandpasses permitted for filters 74*a* and 74*b* compared to that of the single filter, permits filters 74*a* and 74*b* to be constructed without difficulty to obtain suitable rejection of frequencies 244.5 and 246.0 kilocycles.

In order to obtain the necessary connection of filters 74*a* and 74*b* to the output of mixer $M_4$, filter switch 73 is provided. It is actuated by kilocycle knob 12 through a cam arrangement 75, that alternately closes contacts 73*a* and 73*b* as knob 12 passes respectively from a .0 kilocycle setting to a .5 kilocycle setting. Such a cam can have a starwheel shape that rotates with knob 12 and actuates a cam follower connected to switches 73 and 76.

Mixer $M_5$ is provided which has one input connected to the outputs of filters 74*a* and 74*b* to receive the filtered frequency from mixer $M_4$. The second input to mixer $M_5$ is connected to the pole of a sidestep switch 76, which has one contact 76*a* connected to the 5.0-kilocycle reference frequency, and another contact 76*b* connected to the 4.5-kilocycle reference frequency.

Sidestep switch 76 is interlocked with filter switch 73 so that they are actuated together at the integral and half-integral settings of kilocycle dial 12 by means of cam 75. Thus, on integral kilocycle settings of knob 12, the sidestep switch will connect the five-kilocycle reference frequency to mixer $M_5$; and on half-kilocycle steps of the kilocycle knob, the sidestep switch will instead connect the 4.5-kilocycle reference frequency to the mixer input.

The sum of the inputs to mixer $M_5$ will be 250 kilocycles plus any frequency error of interpolation oscillator 62, for each of the two positions of switches 73 and 76. Accordingly, in one position, 245.0 kilocycles is added to 5.0 kilocycles; and in the other position, 245.5 kilocycles is added to 4.5 kilocycles.

A narrow band-pass filter 77 is connected to the output of mixer $M_5$. It may have a bandpass of 500 cycles-per-second centered about 250 kilocycles-per-second. In this case, the filter will not only attenuate spurious products of its direct inputs, but will also further attenuate adjacent spurious products previously attenuated by filters 74*a* and 74*b*. Filter 77 may also be a mechanical filter such as Collins type No. F250–05. If a single filter had been used in place of filters 74*a* and 74*b*, the requirements for filter 77 would be so stringent that they would be impractical.

Amplifier 78 is connected to the output of filter 77 and provides the output of the second-reference channel.

The second-reference channel is used only when it is required for the system to provide an incremental output that varies in one-half kilocycle steps over the frequency range of 2 to 32 megacycles. Thus, the output of the second-reference channel is connected into the system when it is set to "incremental" position, and is not connected into the system when switch 13 is set to its "continuous" position.

A frequency discriminator 81, tuned to the fixed frequency, 250-kilocycles, has its input 82 connected to the output of the first-reference channel which is received from limiter and amplifier 58. Frequency discriminator 81 provides a relatively coarse indication of any frequency error existing in the output of the first channel caused by master oscillator 14. This is because the output of the first-reference channel will be 250 kilocycles if no frequency error exists, and will deviate from this amount by the difference in the errors of master oscillator 14 and interpolation oscillator 62. Since the error caused by the interpolation oscillator (less than 100 cycles) is generally insignificant compared to the sensitivity of discriminator 81, it primarily senses the master-oscillator error.

A phase detector 83 provides a fine indication of frequency error existing in the system. It has one input 84 connected to the output of the first-reference channel, and has its second input 85 connected to the output of a limiter 86 to receive the output of the second-reference channel when selector switch 13 is in its "incremental" position, and to receive the 250-kilocycle reference frequency when switch 13 is in "continuous" position.

A dual low-pass filter 88 is connected to the outputs of both frequency discriminator 81 and phase detector 83. Low-pass filter 88 has a cutoff frequency determined by the maximum rate of error correction permitted by a master-oscillator frequency-regulating fedback loop which is completed by a direct-current amplifier 91, and a saturable reactor 92.

A direct-current amplifier 91 has its input connected to the output of low-pass filter 88. Saturable reactor 92 receives the output of direct-current amplifier 91 and controls a reactance within the tuned circuit of variable-master oscillator 14 to finely adjust its frequency in response to the output of frequency discriminator 81 and phase detector 83. Such saturable reactors have a saturating winding connected to the output of direct-current amplifier 91 with static current in the amplifier providing direct-current bias, and a master-oscillator-regulating winding which forms a part of the master oscillator tank circuit. Such a saturable-reactor controlled oscillator may be Collins type 70H–8.

In the illustrated system, the unstabilized output frequency of variable-master oscillator 14 is assumed to be directly tunable to an indicated frequency with an error of not greater than plus-or-minus one-tenth of one percent. The interpolation oscillator is assumed to be directly tunable with an error of not greater than about plus-or-minus one-fortieth of one percent, with respect to their maximum frequencies. These errors are compatible with presently available oscillators, and the smaller error of the interpolation oscillator is obtained by operating it over a proportionally smaller range than the master oscillator. Accordingly, variable-master oscillator 14 will have an absolute direct-tuning error of not greater than about plus-or-minus 4,000 cycles-per-second; while interpolation oscillator 62 will have an absolute direct-tuning error of not greater than plus-or-minus 100 cycles-per-second.

The operation of the system will first be explained when selector switch 13 is set to provide a "continuous" output from the system. In this position, the 250-kilocycle reference signal is provided through limiter 86 as input 85 of phase detector 83. It is assumed for illustration purposes that band knob 10 is set to band four, that megacycle knob 11 is set to 24.8 megacycles, and that kilocycle knob 12 is set to zero kilocycles. Then, the master oscillator is initially tuned, before stabilization, to an intended frequency of 3.1-megacycles but with an assumed error of minus three kilocycles, which makes its actual unstabilized frequency, 3.097 megacycles. Keyed oscillator 52 will select and tunable filter 53 will pass a small group of harmonics, in which the harmonic having a frequency of 25.5 megacycles will have a large amplitude and is the desired harmonic.

In band four, band switch 28 engages contact 34, and variable-master oscillator 14 will have its output frequency multiplied by seven in multiplier 27 to provide an input to mixer $M_1$ of 21.679 megacycles. The heterodyned output from mixer $M_1$ that is selected by tunable filter 54 is hence 3.821 megacycles. The mixer products of the other harmonics will be displaced by 100 kilocycle intervals from this frequency, and will be attenuated to some extent by filter 54, since it has a bandpass of about plus-and-minus 80 kilocycles around its tuned frequency.

Mixer $M_2$ receives the output of filter 54 and also receives the 3.097 megacycle frequency directly from master oscillator 14 to provide a heterodyned output of 724 kilocycles, which is passed by fixed band-pass filter 56 and is received by mixer $M_3$.

The other input to mixer $M_3$ is received from interpolation oscillator 62. Since the kilocycle dial is set to zero, the interpolation oscillator will be providing an output frequency of 450 kilocycles with an assumed-maximum error of minus 100 cycles. Thus, its output frequency is 449.9 kilocycles, which is heterodyned with the 724 kilocycle frequency in mixer $M_3$ to provide an output frequency of 274.1 kilocycles which is selected by fixed filter 57 and is provided to the discriminator through limiter and amplifier 58.

Thus, the input frequency to the discriminator is 24.1 kilocycles away from its center frequency of 250 kilocycles, with the difference being the multiplied error of master oscillator 14 which is 24 kilocycles and the 100 cycle error of the interpolation oscillator. Thus, the discriminator puts out a direct-current signal which operates the saturable reactor to move the master-oscillator frequency in a direction that decreases its frequency error, until the phase detector output becomes sufficiently large to take control of the system, which might occur when the discriminator-input frequency deviates by less than 500 cycles-per-second from the 250 kilocycle-per-second tuned frequency. Thereafter, the alternating-current output of phase detector 83 takes over the regulating operation and compares its 250-kilocycle reference frequency with its input signal frequency from the first-reference channel, which has been brought to about 250.5 kilocycles by the frequency discriminator. The phase detector provides an alternating-current signal, equal to the difference frequency between its two input signals, which passes through the low-pass filter to modulate the master-oscillator frequency at that rate, which consequently modulates the output of the first-reference channel. During this modulation, the input from the first-reference channel swings toward and phase locks with the 250-kilocycle reference-frequency input.

In the phase locked condition, the output frequency provided from the first channel will be equal to the 250-kilocycle reference frequency, and the output of the system from filter 38 will have a plus frequency error of 100 cycles-per-second, which is the error in the interpolation-oscillator frequency. This occurs because the master-oscillator frequency must be 3.1000125 megacycles to satisfy the system during this example of "continuous" operation.

Thus, with the megacycle dial set to 24.8 megacycles, and the kilocycle dial set to zero, there will be an output frequency from mixer $M_A$ of 24.8001 megacycles.

If the kilocycle dial is then varied from zero up to 100 kilocycles, the output frequency will smoothly vary from 24.8001 megacycles to 24.8101 megacycles, assuming that the interpolation oscillator error remains at its maximum value of 100 cycles.

The operation of the invention will now be explained with an example of "incremental" operation. Hence, selector switch 13 is set to its "incremental" input position, and the output of the second-reference channel is connected through limiter 86 to input 85 of the phase detector. It may be assumed that the knobs are set to the same frequency as in the previous example, with the megacycle dial at 24.8 megacycles, and the kilocycle dial at zero. Also, there is assumed to be a similar initial unstabilized error in the master-oscillator frequency of three kilocycles-per-second and a similar 100-cycle error in the interpolation-oscillator frequency.

In this case, the output of the first channel will again actuate frequency discriminator 81 until the output of the first-reference channel is within about plus-or-minus 500 cycles of the 250-kilocycle center frequency of discriminator 81.

However, the operation of phase detector 83 will bring the system output frequency to precisely 24.8 megacycles with a stability of the same order as frequency-standard source 40, and any error from the interpolation oscillator will be canceled, as follows:

When the kilocycle knob is set to indicate zero-kilocycles (or any other integral number of kilocycles), filter switch 73 connects 245-kilocycle filter *74a* to the output of mixer $M_4$ to provide one input to mixer $M_5$; and side-step switch 76 connects the five-kilocycle reference frequency to the other input to mixer $M_5$.

Since kilocycle knob 10 is set to zero, keyed oscillator 72 provides an output harmonic of 695 kilocycles among a small group of harmonics of the one-kilocycle reference frequency, in which the nearest frequencies are 694 and 696 kilocycles. Thus, mixer $M_4$ receives these frequencies from keyed oscillator 72 and 449.9 kilocycles from interpolation oscillator 62 (error of 100 cycles-per-second) to provide a basic output frequency of 245.1 kilocycles, which is passed by filter *74a*. The spurious frequencies of 244.1 and 246.1 kilocycles are substantially attenuated by filter *74a*, since they are outside of its bandpass.

Mixer $M_5$, therefore, receives the 245.1 kilocycle mixer signal and the five-kilocycle reference signal to provide an output frequency of 250.1 kilocycles, which is passed by the 250-kilocycle filter 77, amplified by amplifier 78, and limited in amplitude by limiter 86 to provide an input signal to phase detector 83 of 250.1 kilocycles. This phase-detector input is not affected by the regulating-feedback loop and, therefore, remains fixed during the frequency-regulating operation of the system. Thus, the output of the second-reference channel will be a stabilized 250 kilocycles minus the frequency error of the interpolation oscillator.

The regulating action is solely provided in the first-reference channel by automatic control of the master-oscillator frequency until a phase lock occurs at 250.1 kilocycles.

The phase detector action in this example is similar to that described in the previous example and the saturable reactor causes a frequency modulation of the first-reference channel frequency, until a phase lock occurs to cause the output frequency of the first channel to equal the output frequency of the second channel. When this occurs at 250.1 kilocycles, in this example, the master-oscillator frequency must be precisely 3.1 megacycles, which is the frequency indicated by the knob settings.

The error of the interpolation oscillator has no effect upon the output of the phase detector because it is provided equally to both of its inputs. Thus, the precise incremental" output frequency is required to satisfy the system, in spite of the 100-kilocycle error of the interpolation oscillator.

An illustrative example will now be given when kilocycle knob 12 is set to indicate a frequency midway between integral kilocycle values. For example, knobs 10, 11 and 12 are set to a frequency 24,800.5 kilocycles, which is one-half kilocycle higher than the frequency in the preceding example. Thus, knob 10 is set to band four, knob 11 is set to 24.8 megacycles, and knob 12 is set to 0.5 kilocycle.

At this frequency, interpolation oscillator 62 is set to an intended 449.5 kilocycles, with an assumed error of 100 cycles-per-second to provide an actual output of 449.4 kilocycles. This is received as one input to mixer $M_4$.

The other input to mixer $M_4$ is provided by keyed oscillator 72. It provides substantially the same group of harmonic frequencies as provided in the previous example. It is only the amplitudes of the harmonics in the small group that are changed by varying the tuned frequency of the keyed oscillator by one-half kilocycle. In this case, Figure 4 illustrates the harmonic spectrum provided at the output of keyed oscillator 72 when kilocycle knob 12 is tuned to 0.5 kilocycle. Here, the tuned frequency is midway between harmonics of the one-kilocycle reference frequency, and the adjacent harmonics of frequencies 694 and 695 kilocycles will have equal amplitudes.

However, the system only requires the 695 kilocycle harmonic and the others are not desired.

Mixer $M_4$ heterodynes these harmonics with the 449.4-kilocycle frequency from interpolation oscillator 62 to provide a required output frequency of 245.6 which is passed by filter **74*b*** to one input of mixer $M_5$. The spurious harmonics provide heterodyne components at least one kilocycle away from the filter's center frequency and are attenuated by it.

Also, at this setting of kilocycle knob 12, sidestep switch 76 connects the 4.5 kilocycle reference frequency to the other input of mixer $M_5$.

The 245.6 kilocycle frequency is heterodyned in mixer $M_5$ with the 4.5 kilocycle sidestep frequency to provide an output frequency of 250.1 kilocycles, which is the output frequency of the second-reference channel and is the same as was obtained in the previous example with the knobs set to obtain 24,800.0 kilocycles.

Furthermore, the first-reference channel will have some of its injected frequencies altered because of the one-half kilocycle change in the interpolation-oscillator frequency, which now injects 449.4 kilocycles into mixer $M_3$ instead of the 449.9 kilocycles in the prior example. Since the output of the first channel must equal the 250.1 kilocycle output of the second channel due to the phase-lock obtained in the system, the regulator action must readjust the frequency of master oscillator 14, because this is the only internally regulated quantity in the system. The master-oscillator frequency will then be stabilized at 3,100.0625 kilocycles-per-second to provide a phase-locked output of 250.1 kilocycles from the first-reference channel.

This master-oscillator frequency is multiplied in multiplier 27 and heterodyned in mixer $M_A$ to provide the precise 24,800.5 kilocycle output of the system in this example.

Any number of sidestep frequencies may be used in the generic system. Each added sidestep frequency will further multiply the number of incremental outputs from the system. The sidestep frequencies are spaced from each other by increments that are equal to the frequency steps in the incremental output of the system. These increments may be any fraction of the frequency increments that would be provided by the system without the sidestep feature.

It is generally desirable to use a decade system for indicating all output frequencies. This was done in the illustrated example. In some cases, it may be required to vary the output of the system in 0.1 kilocycle increments rather than in 0.5 kilocycle increments. This can be done by providing ten sidestep frequencies spaced by one-tenth kilocycle increments. Thus, a set of sidestep frequencies such as 1.1, 1.2, . . . , 1.9 and 2.0 kilocycles may be used, and may be provided from frequency-standard source 40 in the manner shown in Figure 5, which also preferably uses regenerative dividers.

Figure 5:
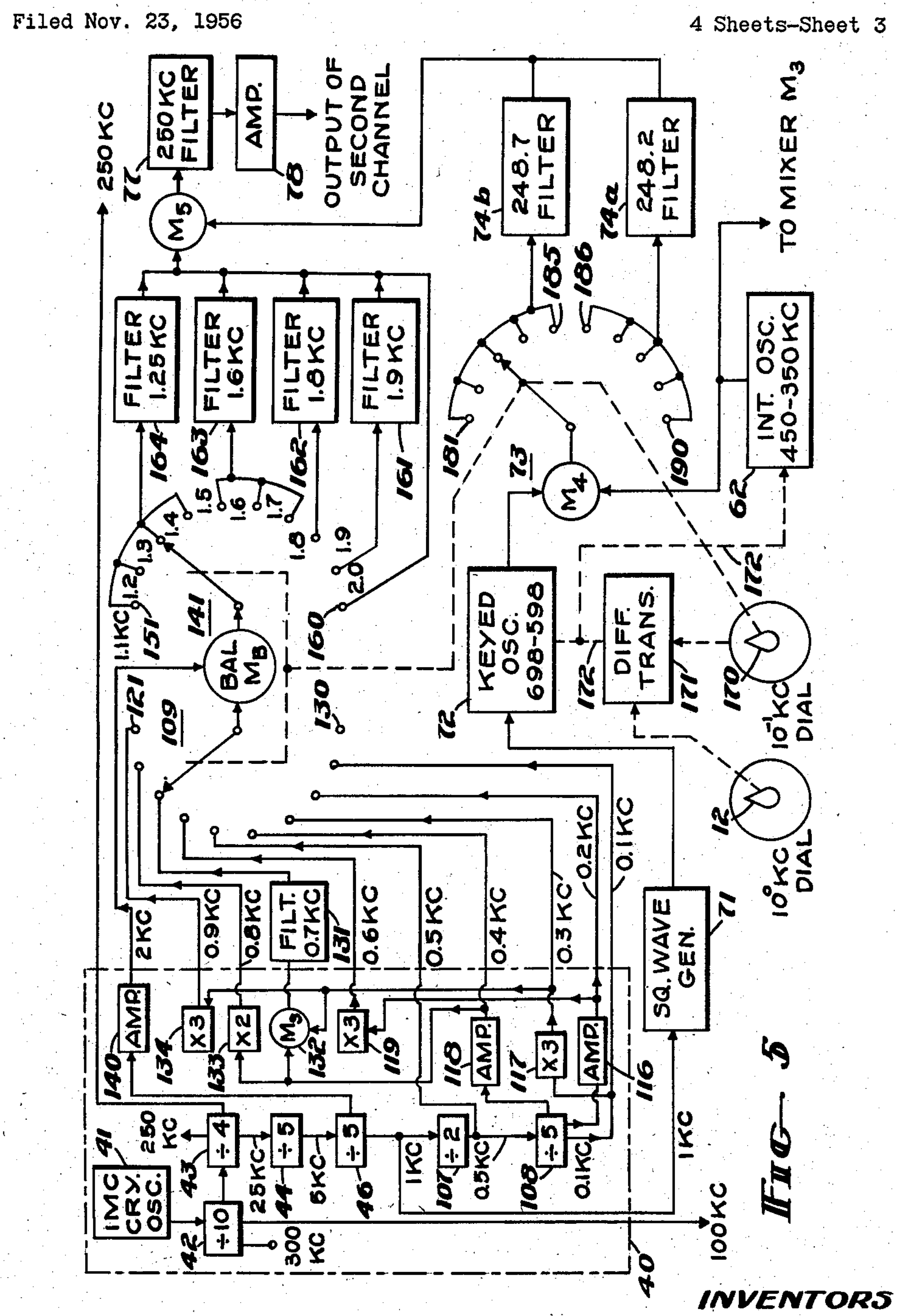
Figure 5 illustrates another version of the sidestep feature of the invention; and, Figure 6 shows a frequency mixing system for modulating the output of the invention.

Accordingly, frequency-standard source 40 in Figure 5 uses components 41, 42, 43, 44 and 46 in the same manner as source 40 in Figure 4. In Figure 5, the one kilocycle output is received by a divider 107 which divides it by two to provide a frequency of 0.5 kilocycle. Another frequency divider 108 divides by five the 0.5 kilocycle output from divider 107 to provide a frequency of 0.1 kilocycles.

The sidestep switch in Figure 5 has two single-pole portions, which are provided by switches 109 and 141. Ten-position single-pole tap switch 109 has contacts 121 through 130, wherein contact 130 is not connected, and its remaining contacts respectively receive frequencies 0.1 through 0.9 kilocycle, which are obtained as follows: The 0.1 kilocycle frequency is obtained directly from divider 108; the 0.2 kilocycle frequency is obtained by a tuned amplifier 116 that selects the second harmonic output from divider 108. The 0.3 kilocycle frequency is obtained from a frequency multiplier 117 that receives the 0.1 kilocycle output of divider 108. The 0.4 kilocycle frequency is a feedback component in regenerative divider 108 and is further selected by a tuned amplifier 118. The 0.5 kilocycle frequency is taken directly from the output of divider 107. The 0.6 kilocycle output is obtained from a ×3 frequency multiplier 119 which is connected to amplifier 116. The 0.7 kilocycle frequency is obtained from a filter 131 that selects the first-order summed output of a mixer 132 which receives one input from amplifier 118 and another input from multiplier 117. The 0.8 kilocycle frequency is obtained from a ×2 frequency multiplier 133 that is connected to amplifier 118. The 0.9 kilocycle frequency is obtained from the outputs of ×3 multiplier 134, which is connected to the output of multiplier 117.

A balanced mixer $M_B$ is provided for generating the sidestep frequencies 1.1, 1.2 . . . 1.9 kilocycles used in the system of Figure 5. Mixer $M_B$ has one input connected to the pole of switch 112; and its other input receives a two-kilocycle frequency provided from a multiplier 140 that is connected to the output of divider 46. The desired outputs of mixer $M_B$ are selected by a switch 141 which has ten contacts 151 through 160; and its single pole is connected to the output of balanced mixer $M_B$. The ten contacts 151 through 160 of switch 141 are connected to a filter network for selecting the respective sidestep frequencies 1.1 through 2.0 kilocycles, that are provided as one input to mixer $M_5$ in a similar manner to that described for the system in Figure 4.

Due to the closer spacing of the frequency output components from mixer $M_B$ when providing the high end of the sidestep frequency sequence as opposed to farther spacing at the low end, more stringent filtering is necessary for the higher sidestep frequencies. Thus, a narrow-band filter 161, tuned to 1.9 kilocycles, receives that output from mixer $M_B$ and separates it from the 2.1 kilocycle mixer component. Similarly, filter 162 passes the 1.8 kilocycle mixer component and attenuates its 2.2 kilocycle component.

As the desired sidestep frequencies recede from the two kilocycle signal, the filtering requirements become less stringent and permit wider bandpasses, which will pass any one of several sidestep frequencies and yet separate them from the undesired mixer components. Thus, filter 163 tuned to 1.6 kilocycles selects the 1.5, 1.6 and 1.7 sidestep frequencies respectively; and filter 164 tuned to 1.25 kilocycles selects the sidestep frequencies 1.4, 1.3, 1.2 and 1.1 kilocycles.

An additional knob 170 is provided which indicates the $10^{-1}$ kilocycle digit in the output frequency of the system. Its one-tenth kilocycle settings are combined in a second-differential transmission 171 which has its output shaft 172 connected to interpolation oscillator 62 to provide exact tuning information. A cam arrangement, such as cam 75 in Figure 1, is therefore not needed in the modification of Figure 5. Mechanical information for the sidestep switches is directly obtained from knob 170. Keyed oscillator 72 in Figure 5 is also connected to the output shaft 172 of differential transmission 171, although the keyed oscillator could remain connected to kilocycle knob 12, since its output is not substantially affected by the movement of knob 170. In this case, keyed oscillator 72 has a range between 698 and 598 kilocycles-per-second.

The pair of filters **74*a* and 74*b* may still be used to receive the output of mixer $M_4$ in Figure 5, although it would be preferable for them to have a bandpass of about 600 cycles-per-second each. Their center frequencies are changed to 248.2 and 248.7 kilocycles respectively because of the different values of sidestep frequencies. Filter 74*a* passes frequencies 248.0 through 248.4; and filter 74*b*** passes frequencies 248.5 through 248.9 kilocycles, plus-or-minus the interpolation-oscillator error, which is less than one-hundred cycles-per-second.

The single-pole ten-position filter switch 73 in Figure 5 connects filters **74*a* and 74*b* to the output of mixer $M_4$ according to the setting of knob 170. Thus, its five contacts 186 through 190 are connected to the input of filter 74*a*; and the other five contacts 181 through 185 are connected to the input of filter 74*b***.

Consequently, mixer $M_5$ receives as one input the respective output of filter **74*a* or 74*b*; and receives as its other input the sidestep frequency selected by the position of one-tenth kilocycle knob 170**.

The knob positions that correspond to kilocycle settings 0.0 through 0.9 are respectively correlated with the sidestep frequencies 2.0 through 1.1 kilocycles. Accordingly, as knob 170 travels from 0.0 to 0.9, sidestep switch 109 travels from contact 130 to contact 121, sidestep switch 141 travels from contact 160 to contact 151, and filter switch 73 travels from contact 190 to contact 181.

As a result, the output of mixer $M_5$ will have a component which will be 250 kilocycles, plus or minus the interpolation-oscillator error, at each setting of the one-tenth kilocycle knob.

The one-tenth kilocycle variations of the interpolation oscillator are injected into the first channel to cause the regulator feedback to readjust the master-oscillator frequency accordingly to satisfy the system. Thus, when the system illustrated in Figure 5 is substituted in the system illustrated in Figure 1, the "incremental" output of the system from filter 38 will vary in one-tenth kilocycle steps to provide a total of 300,000 different frequencies over the 2 to 32 megacycle range.

As stated above, the sidestep frequencies and the frequencies of filters **74*a* and 74*b* are to some extent arbitrary. It is only essential that the sum of their frequencies, respectively provided by mixer $M_5$, always fall within the bandpass of filter 77, which must have a bandpass narrow enough to reject unwanted mixer components from mixer $M_5$. In this case, the unwanted components will be nearest when the lowest sidestep frequency is received, which will be 1.1 kilocycle in Figure 5. The absolute values of the sidestep frequencies may be increased, without changing their frequency spacings, to decrease the filtering difficulties of filter 77**.

Figure 6:
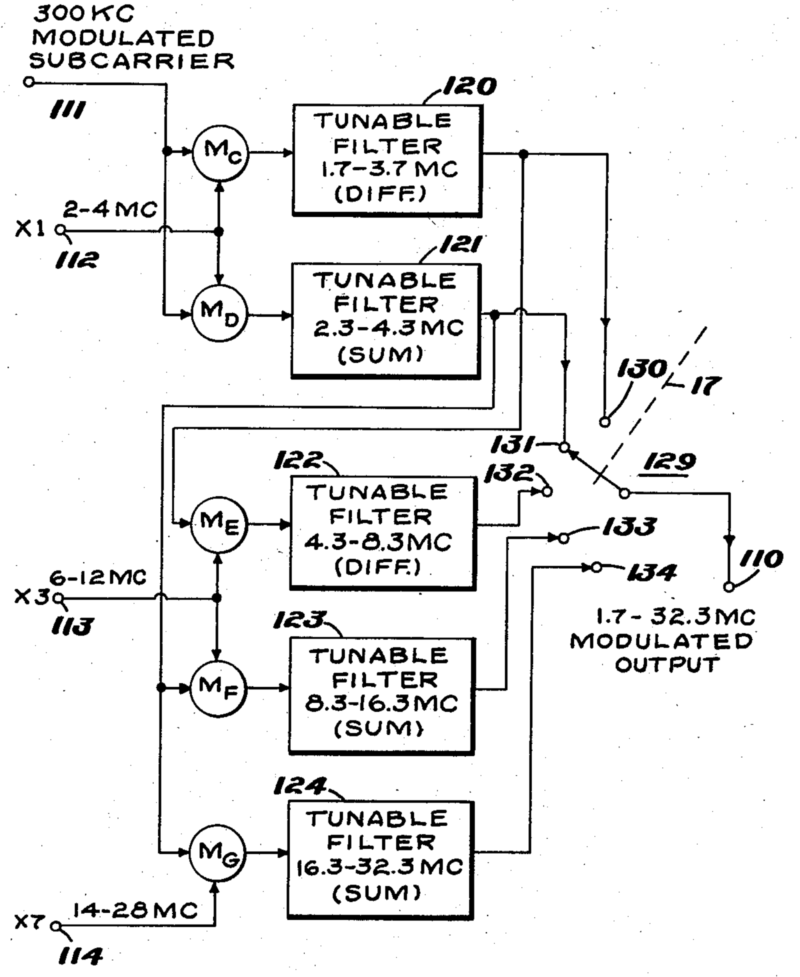

Figure 6 illustrates a means for obtaining stabilized-modulated output frequencies over a very large range. This system permits any type of modulation to be utilized. For example, it may be single-sideband, twin-sideband, dual-sideband, amplitude, frequency-shift-keying, angular, predicated wave, band-synchronous, or etc. modulation.

The modulation is provided to the system of Figure 6 on a modulated-subcarrier frequency by means not a part of this invention. The illustrative example assumes a subcarrier frequency of 300 kilocycles that is received at terminal 111 in Figure 6.

The system illustrated in Figure 6 synthesizes any output frequency within a range from 1.7 through 32.3 megacycles-per-second with substantially undistorted modulation imposed thereon. Generally, in any frequency synthesizing system utilizing heterodyning steps with a modulated signal, the modulation is unavoidably distorted by each heterodyning step. This invention utilizes not more than two frequency mixing stages in any band between the stabilized output of variable-master oscillator 14 and the modulated output of the system, which is now taken from terminal 110 in Figure 6, (and is no longer taken from filter 38 in Figure 1 which provides only an unmodulated single-stabilized frequency). In fact, when only the modulated output is desired, mixer $M_A$, its component part of switch 28, and filter 38 may be eliminated from the system.

The synthesizing system in Figure 6 receives only the single-output frequency of master oscillator 14 which is stabilized by the system illustrated in Figure 1. This single frequency is multiplied differently by multipliers 23 and 27 (which are also required by the stabilization system), to provide at terminals 112, 113 and 114 in Figure 1 frequency multiples of the master oscillator output which are ×1, ×3 and ×7 respectively.

Terminals 112, 113 and 114 are thus shown as the input terminals in Figure 6.

A pair of mixers $M_C$ and $M_D$ each have one of their inputs connected to terminal 111 to receive the modulated subcarrier. They each have their other input connected to terminal 112 to receive the unmultiplied output frequency from master oscillator 14 which varies between 2 and 4 megacycles. A tunable filter 120 is connected to the output of mixer $M_C$ and selects its first-order difference frequency within the range of 1.7 to 3.7 megacycles.

Another tunable filter 121 is connected to the output of mixer $M_D$, and it is tunable over a range from 2.3 to 4.3 megacycles to select its first-order summed output frequency which extends over a range from 2.3 to 4.3 megacycles.

Terminal 110 provides the modulated-output frequency of the system and is connected to the pole of a five-contact switch 129 which is coupled mechanically to shaft 17 and is operated by the band knob. Switch 129 has contacts 130, 131, 132, 133 and 134. Contacts 130 and 131 respectively connect to the outputs of filters 120 and 121.

The output frequencies of filters 120 and 121 overlap. However, in combination, they extend the frequency range of the system, although they have the same input frequencies. It will be noted that in single-sideband operation, the sideband will be reversed with respect to the outputs of filters 120 and 121, because one is a difference filter and the other is a sum filter.

When using the synthesis system of Figure 6, switch 28 in Figure 1 is provided with a fifth contact (not shown), which is grounded, in order to correspond to contact 130 of switch 129 in Figure 6; and the band-switch knob is then provided with five positions instead of four, wherein mixer $M_C$ is utilized in the portion of the first band between 1.7 and 2.3 megacycles, and mixer $M_D$ is utilized in the other portion of the first band from 2.3 to 4.3 megacycles.

Note that in either portion of the first band, only one heterodyning stage is used at one time, which is either mixer $M_C$ or mixer $M_D$.

The higher bands utilize the modulated outputs of tunable filters 120 and 121. A second band of modulating frequencies from 4.3 through 8.3 megacycles is obtained from a mixer $M_E$ which has one input connected to filter 120 and another input connected to terminal 113 to receive the ×3 multiplied frequency of variable-master oscillator 14. A tunable filter 122 is connected to the output of mixer $M_E$ and selects its first-order difference frequency over the range from 4.3 through 8.3 megacycles. The output of filter 122 is connected to contact 132 of switch 129.

Note that in single-sideband operation, an additional sideband reversal is provided by filter 122 to restore the sideband to its original subcarrier position.

The third band is obtained by a mixer $M_F$ which has one input connected to tunable filter 121, and has its other input connected also to terminal 113 to receive the ×3 multiplication of variable-master oscillator 14. The output of filter 123 is connected to contact 133 of switch 129.

The fourth band of the system is obtained from a mixer $M_G$ which has one input connected to the output of filter 121 and another input connected to terminal 114 to receive the ×7 multiplied frequency of variable-master oscillator 14. This band ranges from 16.3 to 32.3 megacycles and is obtained by a tunable filter 124 that selects the first-order summed frequency from mixer $M_G$. The output of tunable filter 124 is connected to contact 134 of switch 129.

While an illustrative embodiment has been given which assumes specific values, it will be obvious to a person skilled in the art that the values given are discretionary within the limits of the invention and may be readily modified by a person skilled in the art in applying the invention to different situations.

What is claimed is:

1. A stabilized variable-master oscillator system comprising a frequency source providing at least two reference frequencies having different numerical orders and a plurality of sidestep frequencies spaced by increments equal to a fraction of the lower-order reference frequency; an interpolation oscillator; a first channel including harmonic-generating means receiving said higher-order reference frequency and providing a selected harmonic of it, means for heterodyning said selected harmonic with a signal derived from said variable-master oscillator, means for heterodyning the output of said interpolation oscillator with the first-order difference output of said last-mentioned heterodyning means to provide the output frequency of said first channel; a second channel including harmonic-generating means for receiving said lower-order reference frequency and providing a selected harmonic of it, means for heterodyning said last-selected harmonic with the output of said interpolation oscillator, means for filtering the first-order difference output frequency of said last-mentioned heterodying means, sidestep-switching means for sequentially selecting said sidestep frequencies, means for heterodyning the selected sidestep frequency with said last-mentioned first-order filtered output to provide the output frequency of said second channel, phase-detecting means connected to the outputs of said first and second channels, and regulator means connected between the output of said detecting means and said variable oscillator to regulate a phase-locked condition between the outputs of said channels.

2. A system as in claim 1 comprising means coupling the setting of said interpolation oscillator with said sidestep switch, whereby said sidestep switch is actuated at selected settings of said interpolation oscillator.

3. A system as defined in claim 1 having a plurality of control shafts for initially selecting the frequency of said variable-master oscillator, one of said shafts rotatable in proportion to the higher-order frequency setting of said variable-master oscillator, another of said shafts rotatable in proportion to the lower-order frequency of said variable-master oscillator, the setting of said one shaft selecting the harmonic in said first channel, said another shaft selecting the harmonic in said second-reference channel, said another shaft also selecting the frequency of said interpolation oscillator and setting of said sidestep switch.

4. A system as defined in claim 3 including frequency-multiplication means connected to said master oscillator provide said signal derived from said variable-master oscillator, and a band-control shaft coupled to said frequency-multiplication means to control the frequency band of operation of said system.

5. A stabilized variable-master oscillator system for providing a large number of output frequencies, comprising reference-frequency generating means providing at least two reference frequencies having different numerical orders and a plurality of sidestep frequencies having a difference equal to a fraction of the lower-order reference frequency; a first channel including harmonic-generating means receiving said higher-order reference frequency and providing a selected harmonic of said reference frequency, means for heterodyning said selected harmonic with a signal derived from said variable-master oscillator, an interpolation oscillator, means for heterodyning the output of said interpolation oscillator with the output of said last-mentioned heterodyning means to provide the output frequency of said first channel; a second channel including harmonic-generating means receiving said lower-order reference frequency and providing a selected harmonic of this reference frequency, means for heterodyning said last-selected harmonic with the output of said interpolation oscillator, a plurality of narrow bandpass filters, each having respective center frequencies spaced by the difference between said sidestep frequencies, means for sequentially connecting said plurality of filters to the output of said last-mentioned heterodyning means in response to variation of the output frequency of the system by steps equal to said difference, sidestep switching means for sequentially connecting said sidestep frequencies in step with said filter switching means, means for heterodyning the selected sidestep frequency with the output of said connected bandpass filter to provide the output frequency of said second channel, phase and frequency detecting means connected to the outputs of said first and second channels, and regulator means connected between the output of said detecting means and said variable oscillator to regulate its frequency.

6. A system as defined in claim 5 wherein the bandpasses of said narrow bandpass filters do not substantially overlap each other, and the frequency difference between said sidestep frequency having a decade relationship to said lower-order reference frequency.

7. A stabilized variable-master oscillator system for providing a large number of output frequencies comprising reference-frequency generating means for providing at least two reference frequencies having different decade numerical orders and a pair of sidestep frequencies having a difference equal to one-half of the lower-order reference frequency; a first-channel, including harmonic-generating means for receiving said higher-order reference frequency and providing a selected harmonic of it, means for heterodyning said selected harmonic with a signal derived from said variable-master oscillator, an interpolation oscillator, means for heterodyning the output of said interpolation oscillator with the output of said last-mentioned heterodyning means to provide the output of said first channel; a second channel, including harmonic-generating means for receiving said lower-order reference frequency and providing a selected harmonic of it, means for heterodyning said last-selected harmonic with the output of said interpolation oscillator, narrow bandpass filtering means connected to the output of said last-mentioned heterodyning means, sidestep switching means for sequentially selecting one of said sidestep frequencies, means for heterodyning the selected sidestep frequency with the output of said filtering means to provide the output frequency of said second channel, phase detecting means connected to the outputs of said first and second channels, regulator means connected between the output of said phase detector and said variable-master oscillator, whereby the output of said first channel phase locks with the output of said second channel.

8. A system as defined by claim 7 in which said narrow bandpass filtering means comprising a pair of filters, said filters having center frequencies spaced frequency-wise by an amount substantially equal to the frequency spacing of said sidestep frequencies, means for selectably connecting the inputs of said pair of filters to the output of said means for heterodyning the outputs of said interpolation oscillator and said lower-order harmonic generating means.

9. A system as defined in claim 7 including at least first and second control knobs, means coupling the first of said control knobs to said first harmonic generating means, and means coupling said second control knob to said second harmonic generating means, and means connecting said sidestep-switching means to said second control knob to switch it through a full cycle when the second control knob is varied over a frequency increment equal to said lower-order reference frequency.

10. A stabilized variable-master oscillator system for providing a large number of output frequencies, comprising reference-frequency generating means for providing at least two reference frequencies having different decade numerical orders and also providing a plurality of sidestep frequencies having a difference equal to a fraction of the lower-order reference frequency, a first channel including square-wave generating means receiving said higher-order reference frequency, keyed-oscillator means receiving the output of said square-wave generating means and providing a selected harmonic of said first-reference frequency, master-oscillator mixing means for heterodyning the harmonic component selected by said first keyed-oscillator means and the output frequency of said variable-master oscillator, first fixed means for filtering the output of said master-oscillator mixing means, a variable-interpolation oscillator, interpolation-oscillator mixing means for heterodyning the outputs of said interpolation oscillator and said first bandpass means, and second fixed means for filtering the output of said interpolation-oscillator mixing means to provide the output of said first channel; a second channel, including second square-wave generating means receiving said lower-order reference frequency, second keyed-oscillator means tunable over a range at least equal to the higher-order reference frequency and connected to the output of said second square-wave generating means, another interpolation-oscillator mixing means for heterodyning a selected harmonic component from said second keyed-oscillator means and the output of said interpolation oscillator, narrow bandpass filtering means connected to the output of said second interpolation-oscillator mixing means, sidestep-frequency mixing means having one input connected to the output of said narrow bandpass filtering means, sidestep-switching means for selectably connecting one of said sidestep frequencies to the other input of said sidestep mixing means, second narrow bandpass filtering means for passing the selected output from said sidestep mixing means, phase detecting means having its inputs connected to the outputs of said first and second channels, and regulator means having its input connected to the output of said phase detector and having its output connected to said variable master oscillator to regulate its frequency.

11. A system as defined in claim 10 with said first narrow bandpass filtering means comprising a plurality of filters, with their center frequencies spaced by an amount equal to the increment between said plurality of sidestep frequencies, filter-switching means for sequentially connecting the inputs of said plurality of filters to the output of said second interpolation-oscillator mixing means, with the outputs of said filters being connected to one input of said sidestep-frequency mixing means.

12. A system as defined in claim 11 having first and second control knobs; differential-transmission means, having a pair of input shafts respectively coupled to said first and second control knobs, the output of said differential-transmission means coupled to said variable-master oscillator and said first keyed oscillator means to tune them, said second control knob being coupled to said interpolation oscillator and said second keyed-oscillator means to tune them, and means for coupling said sidestep switching means and said filter switching means to said second control knob to synchronically actuate them in response to rotation of said second control knob at frequency steps equal to the increment between sidestep frequencies.

13. A system for stabilizing a master oscillator variable over approximately a two-to-one frequency range, comprising a band-switch having a plurality of positions at least equal to the number of bands, with at least some of said band-switch contacts being connected through frequency multiplication means to the output of said variable-master oscillator, a standard frequency source providing output frequencies of 100 kilocycles-per-second and one kilocycle-per-second and a pair of sidestep frequencies having a difference related decade wise to said first-mentioned reference frequencies; a first square-wave generator for receiving said 100-kilocycle reference frequency, a first-keyed oscillator tunable over a range equal to the range of the output frequency provided by the system, said first-keyed oscillator connected to and gated by said first square wave oscillator, a first tunable-filter connected to the output of said keyed oscillator to select a given harmonic, a first mixer having one input connected to the output of said first tunable filter and having a second input connected to said band-switch, a second tunable filter connected to the output of said first mixer, a second mixer having one input connected to the output of said second tunable filter and having a second input connected to the output of said master oscillator, a first fixed filter connected to the output of said second mixer, an interpolation oscillator, a third mixer having one input connected to the output of said first fixed filter and having its other input connected to said interporation oscillator, and a second fixed filter connected to the output of said third mixer to provide the output of said first channel; a second channel comprising a second square-wave generator having its input receiving said one kilocycle reference frequency, a second keyed oscillator being tunable over a range at least equal to said first reference frequency, said second keyed oscillator having its input connected to the output of said second square-wave generator, a fourth mixer having one input connected to the output of said keyed oscillator and having its other input connected to said interpolation oscillator, a pair of filters having substantially non-overlapping narrow bandpasses, with the filter frequencies of said narrow bandpass filters being approximately equal to the increment between said sidestep frequencies, filter-switching means sequentially connecting the inputs of said narrow bandpass filters to the output of said fourth mixer, fifth mixer means having one input connected to the outputs of said narrow bandpass filters, sidestep-switching means for sequentially connecting said sidestep frequencies to the other input of said fifth mixer, a third narrow bandpass filter connected to the output of said fifth mixer to provide the output frequency of said second channel, a phase detector having its inputs respectively connected to the outputs of said first and second channels, a frequency discriminator having its input connected to the output of said first channel, a low-pass filter being connected to the outputs of said phase detector and frequency discriminator, direct-current amplifier means being connected to said low-pass filter, and a saturable reactor having its input connected to said direct-current amplifier and its output connected to said variable-master oscillator to stabilize its frequencies.

14. A frequency stabilization system as defined in claim 13 in which said band-switch includes a pole, and four contacts engaged respectively at four band settings of said switch, with the first of said contacts connected to ground, means connecting the pole of said band-switch to said first mixer, means connecting one of said contacts to the output of said master oscillator, means for multiplying the master-oscillator frequency by three connected to another of said contacts, and means for multiplying the master oscillator frequency by seven connected to the fourth of said contacts.

15. A frequency stabilizing system as defined in claim 13 in which said sidestep frequencies are 4.5 kilocycles-per-second and 5 kilocycles-per-second, and said narrow bandpass filters have bandpasses of less than 500 kilocycles-per-second and center frequencies of 245 and 245.5 kilocycles-per-second, respectively.

16. A system as in claim 13 having a band control knob, a megacycle and one-hundred kilocycle control knob, and a kilocycle control knob; said band control knob being coupled to said band switch, said first keyed oscillator, and said first tunable filter; a differential transmission having its input shafts respectively connected to said megacycle control knob and said kilocycle control knob, with the output of said differential transmission being coupled to said first keyed oscillator, said first tunable filter, and said variable master oscillator; said kilocycle control knob being coupled also to said second keyed oscillator, said interpolation oscillator, said filter-switching means, and said sidestep switching means with said filter and sidestep switching means being actuated by said kilocycle knob at one-half kilocycle frequency increments.

17. A system as defined in claim 14 for synthesizing and modulating an output frequency over plural bands with a fixed-modulated subcarrier, comprising a first pair of mixers, each heterodyning the stabilized output frequency of said master oscillator and said modulated subcarrier, first tunable filtering means for selecting the first-order difference frequency from the first of said first pair of mixers, second tunable filter means for selecting the first-order sum frequency of said second of said first pair; a second pair of mixers, each having one input connected to the third multiple of said master-oscillator frequency, the first mixer in said second pair being connected to the output of said first tunable filtering means, the other mixer of said second pair being connected to the output of said second tunable filtering means, third tunable filter means connected to the output of said third mixer to select its first-order difference frequency, fourth tunable filter means connected to the output of the second mixer in said second pair to select its first-order sum frequency; and another mixer having one input connected to the output of said second tunable filter means and another input connected to the seventh multiple of said master-oscillator frequency, and fifth tunable filter means connected to the output of said another mixer.

18. A system as defined in claim 17 in which said master oscillator has a frequency range from two to four megacycles-per-second, and a second band-switch for sequentially connecting the outputs of said five tunable filtering means to provide a modulated output frequency in any of said bands within the frequencies 1.7 to 32.3 megacycles-per-second.

19. In a stabilized system for a variable-master oscillator comprising frequency-source means for providing at least two reference frequencies having different numerical orders and a pair of sidestep frequencies spaced by increments equal to one-half the lower-order reference frequency; a first harmonic generating means, a second channel for providing a comparing frequency, said second channel including first heterodyning means for selecting a harmonic of the lower order reference frequency, second heterodyning means for heterodyning a selected one of said sidestep frequencies with the first heterodyned frequency to provide the frequency output of said second channel, a second harmonic-generating means, a first channel including means for heterodyning the variable-master oscillator frequency with a harmonic of the higher-order reference frequency to provide a frequency close to said second channel output frequency, means for comparing the phase of the outputs of said first and second channel, regulator means connected between said phase means and said master oscillator for adjusting the frequency of said master oscillator to provide a phase lock between the respective channel outputs.

20. A stabilized system for a variable-oscillator comprising, first means providing a first reference frequency spectrum, second means providing a second reference frequency spectrum of smaller increment than said first means, first and second channels, said first channel selecting and heterodyning the variable-oscillator frequency and a frequency from said first reference spectrum, and said second channel selecting and heterodyning a frequency from said second reference spectrum to substantially the same value as said first heterodyned frequency, a phase detector for phase comparing the respective channel heterodyned frequencies, and a feedback regulating loop from the phase detector to the variable oscillator to maintain a phase-locked condition, means providing a plurality of discrete sidestep frequencies spaced by increments that are a fraction of the increment between spectrum frequencies of said second reference spectrum, and heterodyning and filtering means also included in said second-order channel for selecting one of said sidestep frequencies to provide the second channel output frequency equal to the first channel output frequency, whereby the number of available stabilized frequencies of said system is multiplied by the number of sidestep frequencies.

References Cited in the file of this patent

UNITED STATES PATENTS

| | | |
|---|---|---|
| 2,248,442 | Stocker | July 8, 1941 |
| 2,581,594 | MacSorley | Jan. 8, 1952 |
| 2,775,701 | Israel | Dec. 25, 1956 |
| 2,777,064 | Robinson | Jan. 8, 1957 |
| 2,786,140 | Lewis | Mar. 19, 1957 |